United States Patent
Morimoto et al.

(10) Patent No.: US 6,464,737 B1
(45) Date of Patent: Oct. 15, 2002

(54) PRODUCTION METHOD AND SYSTEM FOR GRANULATING POWDERED MATERIAL

(75) Inventors: Kiyoshi Morimoto, Shizuoka (JP); Hirokazu Yoshimoto, Shizuoka (JP); Sanji Tokuno, Tokyo (JP); Hiroshi Tada, Osaka (JP); Kazue Murata, Nara (JP)

(73) Assignees: Kyowa Hakko Kogyo Co., Ltd., Tokyo (JP); Kabushikikaisha Matsui Seisakusho, Osaka (JP)

( * ) Notice: Subject to any disclaimer, the term of this patent is extended or adjusted under 35 U.S.C. 154(b) by 45 days.

(21) Appl. No.: 09/084,919

(22) Filed: May 28, 1998

(30) Foreign Application Priority Data

May 28, 1997 (JP) ............................................. 9-138771

(51) Int. Cl.$^7$ ............................ C05B 19/00; C22B 1/14; F26B 3/08
(52) U.S. Cl. ................................. 23/313 FB; 23/313 R; 34/365
(58) Field of Search .......................... 23/313 R, 313 FB; 34/365

(56) References Cited

U.S. PATENT DOCUMENTS

| | | | |
|---|---|---|---|
| 3,842,978 A | * 10/1974 | Summers | 209/469 |
| 4,126,945 A | * 11/1978 | Manser et al. | 34/4 |
| 5,579,588 A | * 12/1996 | Reh et al. | 34/359 |
| 5,911,488 A | * 6/1999 | Geromini et al. | 34/508 |

FOREIGN PATENT DOCUMENTS

| | | | | |
|---|---|---|---|---|
| DE | 27 53 409 | | 6/1978 | |
| EP | 0570218 A1 | | 11/1993 | |
| EP | 0787935 A2 | | 8/1997 | |
| GB | 1 212 939 | | 11/1970 | |
| JP | 07024292 | * | 1/1995 | |
| JP | 07024292 | * | 1/1999 | ............. 23/313 FB |
| WO | WO 85/03458 | | 8/1985 | |

OTHER PUBLICATIONS

Patent Abstracts of Japan, vol. 199, No. 504, May 31, 1995, 07024292, Fluidized Bed Granulation Method and Its Device.
Patent Abstracts of Japan, vol. 199, No. 704, Apr. 30, 1997, 08332368, Powder Mixing Method Utilizing Pulsated Air Vibration Waves.
Patent Abstracts of Japan, vol. 010, No. 031, Feb. 6, 1986, 60183030, Granulation and Coating Apparatus.

* cited by examiner

*Primary Examiner*—Stanley S. Silverman
*Assistant Examiner*—Jonas N. Strickland
(74) *Attorney, Agent, or Firm*—Jones, Tullar & Cooper, P.C.

(57) ABSTRACT

A production method and system for granulating powdered material wherein powdered material is fluidized by applying heated pulsating vibration air, and the fluidized powdered material is suspended up and down at a regular cycle by means of heated pulsating vibration air, the aggregated material is compressed by further vibration of pulsating vibration air, whereby the aggregated powdered material is efficiently made into granulated material with high density and rather small specific volume without causing projection on the surface and without being made porous. The production system is comprised of a granulation tank for storing powdered material to be granulated, the granulation tank having a supply port for introducing heated air at the bottom thereof, a discharge port for discharging the introduced heated air at the top thereof, and a fluidization bed provided above the supply port for receiving the powdered material. A spray apparatus for spraying a binder solution provided in the granulation tank for aggregating the powdered material stored in the granulation tank for growing the material is provided. An air source connected to the supply port of the granulation tank via a conduit pipe; heating apparatus interposed in the conduit pipe for heating the air generated from the air source; and a pulsating vibration air generation means interposed in the conduit pipe for converting the air generated from the air source to pulsating vibration air.

15 Claims, 9 Drawing Sheets

PRODUCTION METHOD AND SYSTEM FOR GRANULATING POWDERED MATERIAL

BACKGROUND OF THE INVENTION

I. Field of the Invention

The present invention relates to a production method and system for granulating powdered material, and more particularly relates to a production method and system for efficiently granulating powdered material with uniform property and small specific volume using pulsating vibration air.

II. Prior Art

FIG. 12 shows a known fluidized layer granulation system.

The granulation system 101 is comprised of a granulation tank 102, an air source 103, such as a blower fan, a discharge fan 104, heating means 105, such as a heat exchanger, and spray means 106 such as a nozzle means, for spraying a binding solution.

A supply port 102a for introducing heated air is provided under the granulation tank 102, the air source 103 is connected to the supply port 102a via a conduit pipe and the heating means 105 is provided between the supply port 102a and the air source 103. When the air source 103 is driven to cause the heating means 105 also to drive, the air produced by the air source 103 is heated by the heating means 105, the heated air is supplied into the granulation tank 102 from the supply port 102a, and the supplied air is blown up in the granulation tank.

A fluidization bed 107 is provided above the supply port 102a in the granulation tank 102. Powdered material A stored in the granulation tank 102 is deposited on the fluidization bed 107 when air isn't supplied to the granulation tank 102.

Whereas heated air is supplied from the supply port 102a, the powdered material A deposited on the fluidization bed 107 floats to be mixed with the air blown upward from the fluidization bed 107 and forms a fluidized layer following the increase of the wind speed of the supplied air.

Further, a discharge port 102b is provided on the top of the granulation tank 102 and the discharge fan 104 is connected to the port 102b via a conduit pipe. The air supplied to the granulation tank 102 is discharged to the outside by driving the fan 104.

On the other hand, the spray means 106 for spraying a binding solution is provided in the granulation tank 102 and connected with an air source 108 storing pressurized air via an air supply pipe 109, and further a tank 110 for storing a binding solution is connected via a binding solution supply pipe 111. A control unit 112 for adjusting the spraying amount of the spray means 106 is interposed in the middle of the pipe 111.

In FIG. 12, the numeral 113 relates to a bag filter for preventing the raw powdered material A, the granulating material or the granulated material from flowing out of the granulation tank 102 and the numeral 114 relates to a dust collecting filter for eliminating dust in the air supplied to the granulation tank 102.

In order to granulate material utilizing the system 101, the raw material A is stored in the granulation tank 102. Heated air is supplied into the tank 102 by driving the air source 103 and the heating means 105 and simultaneously the discharge fan 104 is driven, whereby the raw material A placed on the fluidization bed 107 is caused to be blown up. The heated air with constant flow amount and constant pressure is always supplied into the tank 102 by controlling the driving force of the air source 103 and the discharge fan 104 so that a desired stable fluidized layer is formed in the tank 102. Thereafter, air with a fixed pressure is supplied to the spray means 106 for spraying a binding solution from the air source 108 and simultaneously the control unit 112 is driven. A binding solution B is sprayed from a desired spray and makes a bridge of solution between particles of the raw material A. The particles of the raw material A suspended in the granulation tank 102 as a fluidized layer mixed with air are aggregated and the aggregated particles are dried to be grown as a granulated material.

In the prior granulation method mentioned above, the granulated material with uniform physical properties (particle diameter, particle shape, etc) can be produced when material is granulated by spraying a binding solution from the nozzle after a dilute fluidized layer is formed by supplying a large amount of heated air with constant pressure and constant amount into the granulation tank 102.

It is known that an increased speed of the particles becomes fast when particles are granulated by spraying a binding solution from the nozzle after a high density fluidized layer is formed by reducing the amount of heated air supplied into the granulation tank 102.

However, when material is granulated by means of the system 101, the granulated material becomes porous and its specific volume increases and becomes large because it is made from the particles floating in the air. In order to solve this problem, a new granulation method has been proposed in JP-A-60-183030.

FIG. 13 is a partially cutaway sectional view of the system disclosed in JP-A-60-183030.

A granulation system 201 is further provided with a rotary vane 202a on the fluidization bed 107 and a driving motor 202 to rotate the rotary vane 202a below the bed 107. Heated air is supplied into the granulation tank 102 and the motor 202 is driven to rotate the vane 202a when the material A stored in the tank 102 is granulated. The material A directly receives rotating power of the vane 202a so that the material is prevented due to agitation from becoming porous.

According to the system 101 shown in FIG. 12, granulated material with a constant properties (particle diameter, particle shape, etc) is produced when material is granulated in a dilute fluidized layer by supplying a large amount of heated air into the granulation tank 102. However, in the prior art, the concentration of the material A in a fluidized layer is dense and the particles of the material A do not doesn't have sufficient opportunity to touch each other so that particle growth becomes slow affecting the productivity of granulation.

Further, when a high density fluidized layer is formed in the granulation tank 102 by reducing the amount of the heated air supplied to the granulation tank 102, each particle of the material A comes collides frequently, so that the particle growth of particle becomes fast. However, the particle diameter of the granulated material doesn't become uniform or projected parts like an antenna of a snail are formed on the surface of the particles so that granulated material with an irregular shape (not spherical) and different diameter is produced. Therefore, the system 101 can't be used when spherical granulated material is required. Furthermore, as mentioned above, the granulated material tends to be porous because the granulation is executed in air. As the result, it is difficult to produce granulated material with small specific volume.

When heated air is supplied at a uniform rate into the granulation tank 102, the air may blow through a part of the material A placed on the fluidization bed 107. In this case some of the material A in the tank 102 remains still and isn't fluidized. Granulated material isn't made from such a material, therefore, and the amount of granulated material becomes less compared to the amount of raw material A.

Slacking, bubbling or chanelling of the material A, which stop fluidization, may be caused in the granulation tank 102 while the material is granulated. The particle diameter, particle shape, density, and hardness of the granulated material depend on the fluidized condition of the raw material A and the granulating material.

Further in the prior art, unintended fine particles may be included in the granulated material. It is desired to reduce the amount of such fine particles. When the system 201 shown in FIG. 13 is used, the granulated material is prevented from being porous because the rotary agitation flow by means of the rotation of the vane 202a. However, it is required to provide the rotary vane 202a on the fluidization bed 107 and the driving motor 202 below the bed 107 for rotating the vane 202a, whereby the number of the parts becomes large and the system is complicated. Foreign material may be produced from the increased parts and the complication makes the cleaning of the system difficult. Such foreign material remaining in the system may be included in the granulated material and increases the risk of contamination. Therefore, such a system isn't appropriate for producing granulated material for fine chemical use such as medicine wherein a high quality granulation without contamination of foreign material is required.

SUMMARY OF THE INVENTION

The present invention is proposed to solve the above-mentioned problems. An object of the present invention is to provide a granulation method and system wherein granulated material with uniform shape, uniform diameter and uniform property and small specific volume can be easily and efficiently produced.

According to the granulation method of the present invention, powdered material stored in a granulation tank is produced into a granulated material with high density and small specific volume as follows.

The powdered material is fluidized by applying heated pulsating vibration air and is aggregated by spraying a binding solution. Therefore, the aggregated powdered material drops and is deposited on a fluidization bed by gravity accompanied by the growth of the particles while they are suspended up and down in the granulation tank according to the frequency of the pulsating vibration air. And thereafter the deposited powdered material under granulation is produced into a granulated material with high density and small specific volume while receiving compression to be high density by means of the heated pulsating vibration air.

According to such a production method, the deposited material under granulation is compressed to a high density by means of the vibration of the pulsating vibration air. Therefore, the projections like an antenna of a snail formed on the surface of the particles of the granulating material are peeled off and each particle of the granulating material deposited on the fluidized bed is compressed together. In the present invention, the produce of the granulated material with the projections or porous property is prevented and granulated material with uniform properties, high density and small specific volume is produced efficiently without difficulty comparing to the prior art wherein powdered material is fluidized by means of constant heated air mixed in the heated air, and a binding solution is sprayed to aggregate the material, and then the material is dried to grow as granulated material.

Four types of pulsating vibration air can be used in the present invention, that is, pulsating vibration air with peaks and valleys of negative pressure, air with peaks of atmospheric pressure and valleys of negative pressure, air with peaks of positive pressure and valleys of atmospheric pressure, and air with peaks and valleys of positive pressure. According to experimental findings, the granulated material with small specific volume and good quality can be obtained when pulsating vibration air with peaks and valleys of positive pressure is used.

It is preferable to use the pulsating vibration air with peaks and valleys of positive pressure.

In the specification "positive pressure" means a condition that the pressure in the granulation tank is higher than the outside pressure (atmospheric pressure). "Negative pressers" means a condition that the pressure in the granulation tank is lower than the outside pressure (atmospheric pressure).

As the result of the actual production using different kinds of powdered material, the amplitude, frequency and wave shape of pulsating vibration air are desirable to be changed according to the property of the powdered material (such as viscosity, diameter, specific gravity, adhesiveness, and miscibility with air of the particles of the material) in order to produce granulated material with uniform properties and small specific volume.

At least either amplitude, frequency and wave shape of pulsating vibration air is changed according to the property of the material.

According to experimental findings, granulated material with small specific volume, that is heavy material, can be obtained when the frequency of the pulsating vibration air is not less than 1 Hz but less than 10 Hz, desirably from 1 Hz to 9 Hz, more desirably from 1 Hz to 6 Hz, still more desirably 5 Hz as the result of production with the pulsating vibration air with different frequency.

Therefore, its preferable to set the frequency of pulsating vibration air to not less than 1 Hz but less than 10 Hz in the production method of the present invention.

A granulation system, with air suction means provided for an air discharge port attached at the top of a granulation tank, with an air supply means provided for an air supply port at the bottom of a granulation tank, with both the air suction means and the air supply means may be considered. As a result of the production with these different granulation systems and a pulsating air generation means, when the pulsating vibration means is provided before the air supply port at the bottom of the granulation tank and pulsating vibration air is supplied under a fluidization bed and directed upwardly, it is easy to fluidize the raw material and suspend a part of the material up and down. Further, compression by means of the vibration of the pulsating vibration air is efficiently applied on the granulation and growing material which has been dropped and deposited on the fluidization layer and the material becomes dense, whereby granulated material with specific volume is produced.

The granulation system of the present invention is provided with a granulation tank for storing powdered material to be granulated. The granulation tank has a supply port for introducing heated air at the bottom thereof, a discharge port for discharging the introduced heated air at the top thereof, and a fluidization bed provided above the supply port for placing the powdered material temporarily. The granulation tank is also provided with spray means for spraying a binding solution to grow the powdered material to be granulated. The system is also provided with an air source connected to the supply port of the granulation tank via a conduit pipe, heating means interposed in the conduit pipe for heating the air generated from the air source, and a pulsating vibration air generation means interposed in the conduit pipe for converting the air generated from the air source to pulsating vibration air.

A pulsating vibration air generation means may be provided with an on-off valve for closing and opening a conduit pipe connecting the air source and the granulation tank so that pulsating vibration air is generated by operating the valve, may generate pulsating vibration air by vibrating a plate by means of the air supplied from an air source, or may be provided with an air suction means at an air discharge port at the top of a granulation tank and an on-off valve for opening and closing a conduit pipe connecting the air discharge port and the air suction means and pulsating vibration air is generated by operating the valve. According to the productive results using the above-mentioned different pulsating vibration air generation means, a rotary type pulsating vibration air generation means is desirable in order to produce granulated material with small specific volume, and more preferably, the rotary type pulsating vibration air generation means is preferably provided between the conduit pipe connecting the air source and the granulation tank.

The pulsating vibration air generation means as mentioned above may be provided with a casing having a pair of connecting ports at the surrounding wall thereof and a rotary valve having a rotational axis in the center of the casing. The valve is constructed so as to divide the inside of the casing into at least two spaces. One of the pair of connecting ports is connected with the heated air supply port and the other port is connected with the air source.

Some materials to be granulated are easy to be mixed with air and the others are not. Therefore, it may be preferable to change the wave shape of the pulsating vibration air in order to fluidize the material stored in the granulation tank and make some of the aggregated material suspend up and down according to the frequency of the pulsating vibration air.

According to the granulation system of the present invention, the above-mentioned pulsating vibration air generation means is provided with a valve for opening and closing the conduit pipe connecting the air source and the heated air supply port, and a valve cam mechanism having guide rails with a specific circular pattern defining the duration and amount of open and close of the valve. The valve is opened or closed vertically in compliance with the irregular pattern of the guide rails by driving the valve cam mechanism.

BRIEF DESCRIPTION OF THE DRAWINGS

FIG. 10 shows a pulsating vibration air generation means.

DESCRIPTION OF THE PREFERRED EMBODIMENT

Preferred embodiments of the present invention will be described hereunder referring to the attached drawings.

Figure 1:
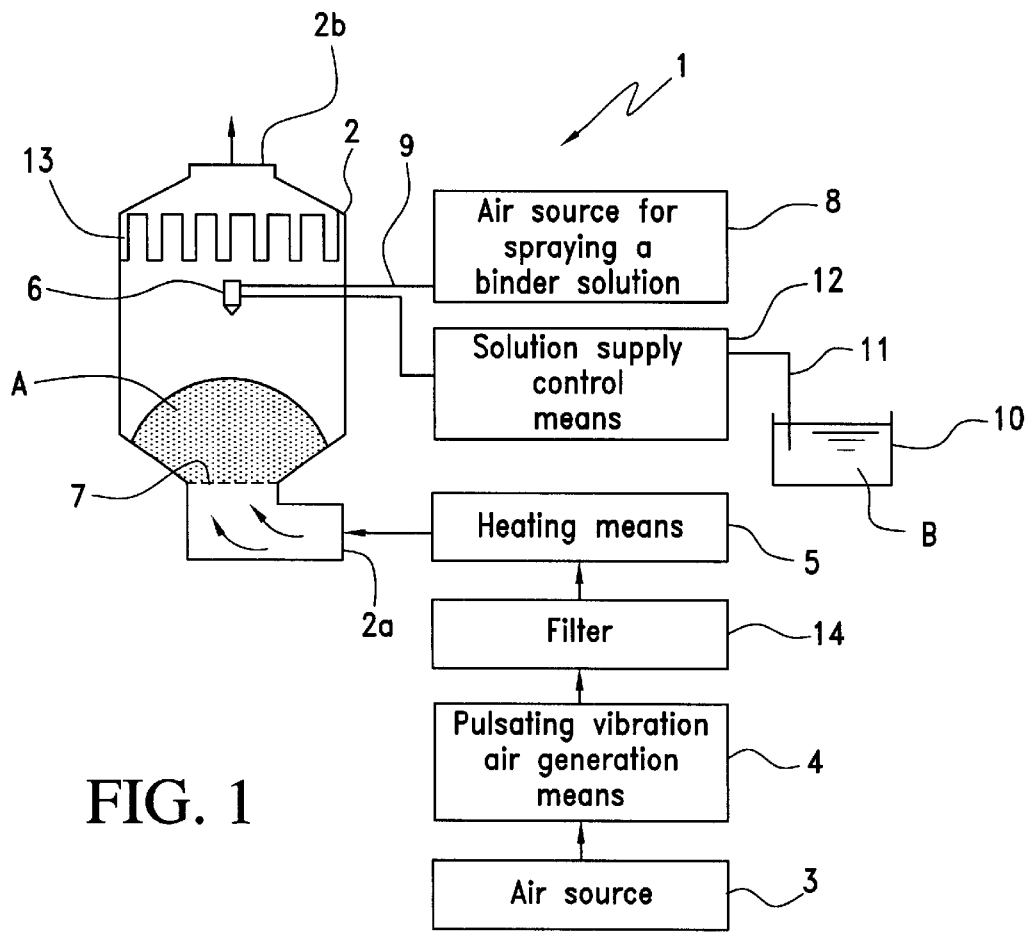
FIG. 1 shows a granulation system of the present invention diagrammatically.

FIG. 1 shows a granulation system of the present invention diagrammatically.

A fluidized layer granulation system 1 is comprised of a granulation tank 2, an air source 3 such as a blower fan, a heating means 5 such as a heat exchanger, and a binding solution spray means 6 such as a nozzle means for spraying a binding solution.

The system 1 is newly provided with a pulsating vibration air generation means 4 between the granulation tank 2 and the air source 3 via a conduit pipe.

The granulation tank 2 is formed like a cylindrical hopper and is provided with a heated air supply port 2a at the bottom thereof. The supply port 2a is connected with the heating means 5 such as a heat exchanger, a filter 14, the pulsating vibration air generation means 4, the air source 3 via conduit pipes.

When the air source 3 is driven and the pulsating vibration air generation means 4 is also driven, the air generated from the source 3 is transformed into pulsating vibration air by means of the pulsating vibration air generation means 4. Further, the pulsating vibration air is heated by the heating means 5 and the heated pulsating vibration air is supplied from the heated air supply port 2a into the granulation tank 2, whereby the supplied pulsating vibration air is blown up in the granulation tank 2.

A fluidization bed 7 is provided above the heated air supply port 2a in the granulation tank 2. The material A stored in the granulation tank 2 is deposited on the fluidization bed 7 temporarily while pulsating vibration air isn't supplied into the tank 2.

When the pulsating vibration air is supplied from the heated air supply port 2a, the material A builds up on the fluidization bed 7 floats in the granulation tank 2 to be mixed in the air blown up from the fluidization bed 7 so as to form a fluidization layer while the pulsating vibration air is at peak side. On the other hand when the pulsating vibration air is at valley side, the velocity of the blown-up air becomes weak. Therefore, some of the material A floating in the air drop on the fluidization bed and deposit thereon.

A discharge port 2b is provided at the top of the granulation tank 2 and the supplied pulsating vibration air in the tank 2 is naturally discharged from the port 2b.

The binding solution spray means 6 is provided at a fixed position in the granulation tank 2, connected with an air source 8 for the binding solution spray means 6 for storing pressurized air via an air supply pipe 9, and connected with a tank 10 for storing a binding solution via a binding solution supply pipe 11.

Further, a supply control means 12 is provided between the binding solution supply pipe 11 for controlling the spray amount of a binding solution B stored in the tank 10 from the spray means 6.

In this embodiment a well-known liquid spray nozzle is used as the spray means 6. The binding solution B stored in the tank 10 is supplied from the supply control means 12 and is sprayed by means of compressed air supplied from the air source for a binding solution spray 8 via the air supply pipe 9.

The numeral 13 in the FIG. 1 refers to a bag filter for preventing the raw material A, the granulating material and the granulated material from flowing out of the granulation tank 2. The numeral 14 refers to a dust collecting filter for removing dust in the air supplied into the tank 2.

Figure 2:
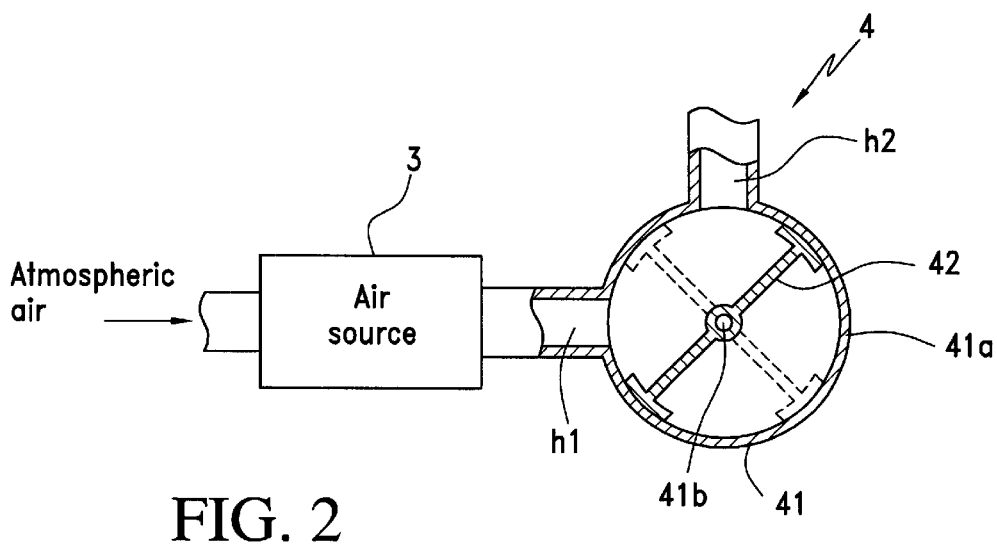
FIG. 2 is a diagrammatic sectional view of a pulsating vibration air generation means.

The construction of the pulsating vibration air generation means 4 is explained referring to FIG. 2.

The pulsating vibration air generation means 4 is provided with a cylindrical casing 41 having a pair of connecting ports h1, h2 at a surrounding wall 41a thereof and a rotary valve 42 having a rotational axis 41b in the center of the casing 41. The rotary valve 42 is constructed so as to divide the inside of the casing 41 into at least two spaces.

One port h1 of the pair of connecting ports h1, h2 provided at the surrounding wall 41a is connected with the air source 3 via a conduit and the other port h2 is connected with the granulation tank 2 via a conduit.

When the air source 3 and the rotary valve 42 of the pulsating vibration air generation means 4 are simultaneously driven, the air generated by driving the air source 3 is supplied into the granulation tank 2 because the air source 3 and the granulation tank 2 are communicated when the rotary valve is positioned at the solid line in the drawing. On the other hand when the rotary valve 42 is positioned at the dotted line, the air source 3 and the granulation tank 2 is blocked by the rotary valve 42.

Figure 3A:
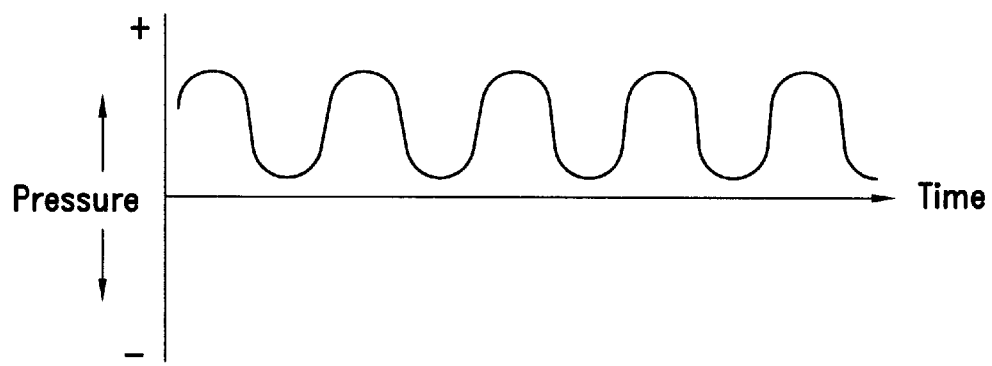
FIGS. 3(a) and 3(b) shows examples of pulsating vibration air applied in the present invention.

In the space, communicating with the port h1 connecting with the air source 3, of the two spaces divided by the rotary valve 42 in the casing 41, the air supplied by driving the air source 3 is compressed. In the other space communicating with the port h2 connecting with the granulation tank 2, the compressed air is supplied into the granulation tank 2 via a conduit and pulsating vibration air of which maximum and minimum values are positive as shown in the FIG. 3(a) is generated in the granulation tank 2, whereby vibration is caused in the conduit and the granulation tank 2.

A granulation method by means of the granulation system 1 is explained hereinafter.

At first, the raw material A is stored in the granulation tank 2. Then the air source 3 is driven, the rotary valve 42 of the pulsating vibration air generation means 4 is driven to be rotated, and further the heating means 5 is driven. The air generated by driving the air source 3 is transformed into the pulsating vibration air as shown in FIG. 3(a) so as to be supplied into the granulation tank 2.

Figure 4A:
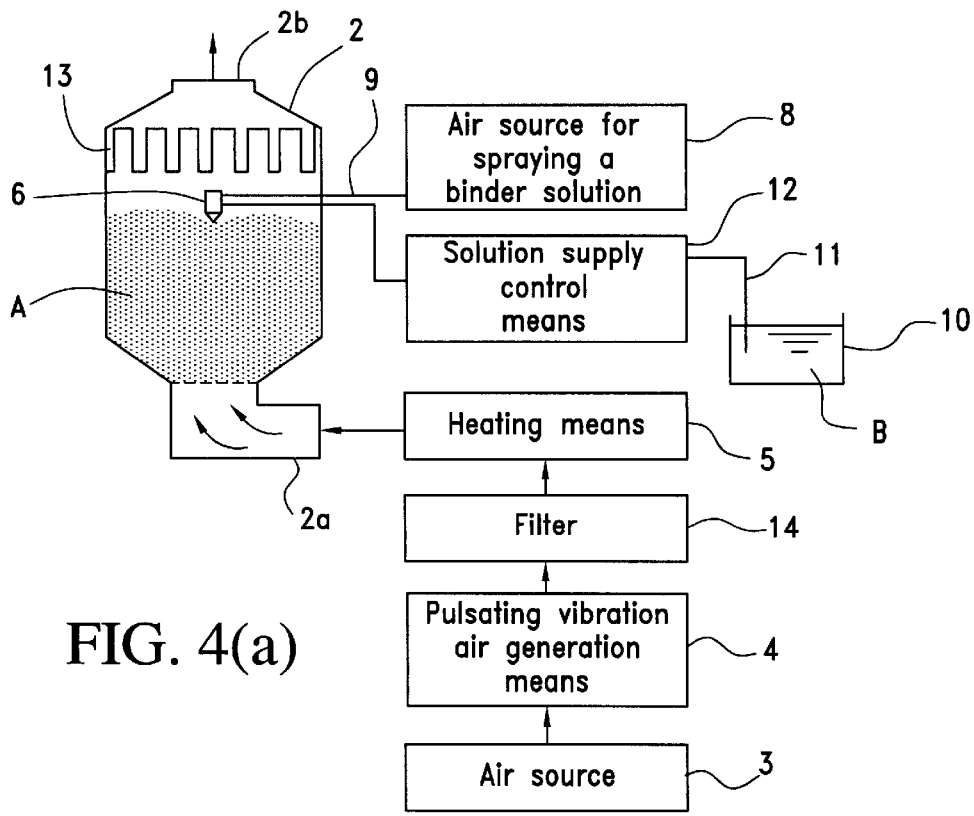
In FIG. 4(a) pulsating vibration air is at its peak and in FIG. 4(b) pulsating vibration air is at its valley.
Figure 4B:
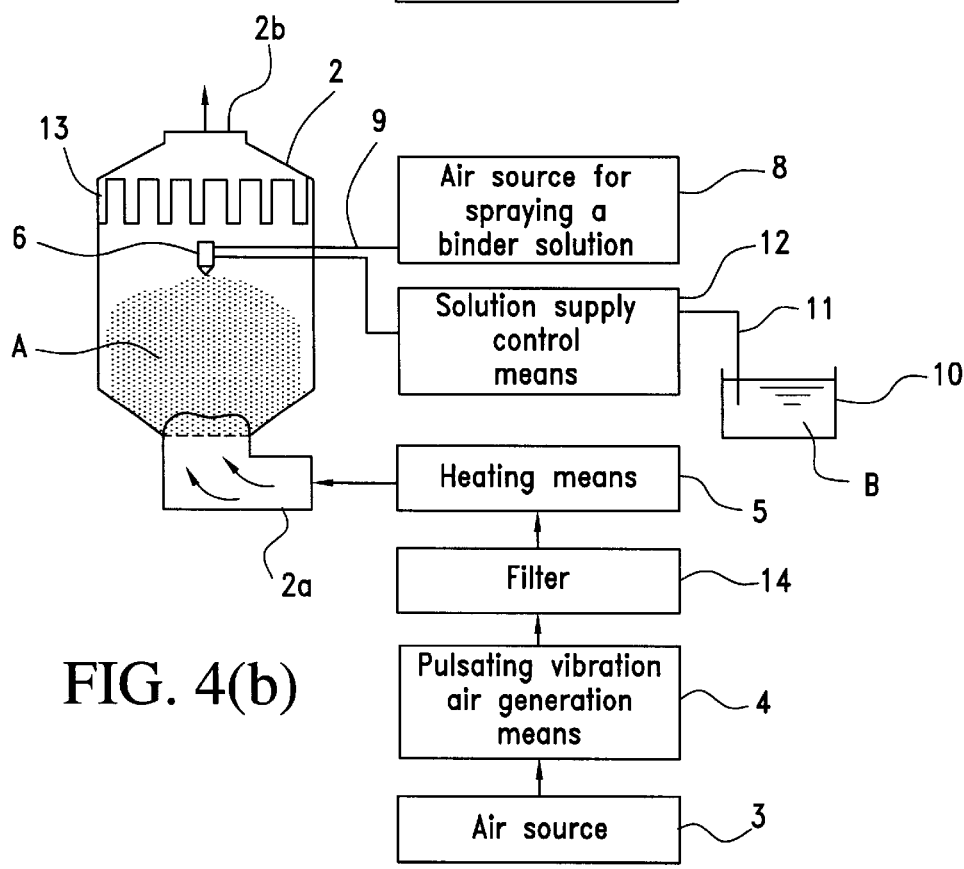
FIG. 4 shows a phenomenon of the inside of the granulation tank according to the present invention.

Most of the raw material A deposited on the fluidization bed 7 is mixed with the air blown up from the bed 7 to be floated in the granulation tank 2 and forms a fluidization layer when the pulsating vibration air is at its peak as shown in FIG. 4(a). On the other hand when the pulsating vibration air is at its valley as shown in FIG. 4(b), the air velocity becomes weak. Therefore, some of the floating material A drop and deposit on the fluidization bed 7. Such a phenomenon appears alternately according to the pulsating vibration air. (The fluidized layer wherein the material A is fluidized and some of the material float and others drop according to the frequency of the pulsating vibration air is called "pulsating vibration air type fluidized layer" in this specification hereinafter).

Whether the fluidized layer becomes high density or low density at the peak of the pulsating vibration air depends on the amount and the property of the raw material stored in the granulation tank 2 and the amount of the air supplied into the tank 2 at the peak of the pulsating vibration air.

In the same way, whether the fluidized layer becomes high density or low density at the valley of the pulsating vibration air depends on the amount and the property of the raw material stored in the granulation tank 2, and the amount of the air supplied into the tank at the valley of the pulsating vibration air.

If the air source 3 is a blower fan, the amplitude and the frequency of the pulsating vibration air supplied into the granulation tank 2 are adjusted by controlling the number of revolution of the blower fan or controlling the speed of revolution of the rotary valve 42 of the pulsating vibration generation means 4 in order that the above-mentioned phenomena appear periodically and stably and a desirable fluidization layer is formed.

Thereafter, a binding solution B is sprayed by a preferable spray by supplying air with a fixed pressure into the binding solution spray means 6 from the air source 8 and controlling the solution supply means 12 so that liquid bridging is formed between the particles of the material A. The particles of the material A are aggregated and dried in the pulsating vibration air fluidized layer formed by heated pulsating vibration air, whereby the particles are grown and granulated material is produced.

A high density fluidization layer and a low density fluidization layer are appeared alternately according to the pulsating vibration air in the granulation tank 2 because heated pulsating vibration air is supplied in the tank 2 of the granulation system 1.

When the fluidization layer of the granulation tank 2 is low density, the particles grow uniformly and slowly, which is the same as when a large amount of heated air is supplied at a fixed rate in the tank 2 to granulate the particles.

On the other hand when the fluidization layer is high density, the particles grow swiftly, which is same as when a small amount of heated air is supplied into the tank 2 to granulate the particles.

In this case projections like an antenna of a snail are formed on the surface of the particles. However, the particles in the granulation tank 2 collide each other by up-and-down movement of the raw material A, the granulating material and the granulated material by means of the pulsating vibration air. Thereby, the projections may be broken or peeled off so that granulated material with a constant physical property having a uniform particle diameter, particle shape and etc.

When the pulsating vibration air is at its valley, some of the raw material A, the granulating material and the granulated material drop and deposit on the fluidization bed 7. Pressurization is applied on such materials to be high density because tapping caused by the weight of the deposited material and the vibration of the granulation tank 2 by the pulsating vibration air are functioned on the materials. Therefore, the granulated material is prevented from being porous so as to be granulated as a high quality granulated material with small specific volume compared to the prior fluidized layer granulation method wherein particles grow while floating in the air.

Further in the present invention, pulsating vibration air with strength and weakness, not a fixed air flow, is applied for forming the fluidization layer by fluidizing the raw material A stored in the granulation tank 2. Therefore, all the material A is stirred evenly and distributed efficiently by the pulsating energy of pulsating vibration air so that the whole material A can become a fluidization layer. As the result, some raw material A isn't deposited on the fluidization bed 7 to be kept still as shown in the prior art wherein a fixed and uniform air flow is supplied to the granulation tank to form a fluidization layer. Moreover, the productivity of the granulated material compared to the original raw material A becomes very high.

The raw material A is stirred uniformly by the pulsating energy of pulsating vibration air because pulsating vibration air with strength and weakness is applied in the present invention. It isn't appeared that the air supplied in the granulation tank 102 blows through the part of the raw material A deposited on the fluidized bed 107, sometimes happened in the prior art wherein air is supplied at a fixed and uniform rate into the tank 102. While in the present invention, the raw material A is easily fluidized and the produced fluidized layer is stable. Therefore, a phenomenon such as slacking, bubbling, chanelling and so on in the process of granulation which stops fluidization of the raw material is prevented or relieved compared to the prior art wherein heated air is supplied into the granulation tank 102 with a fixed and uniform rate, whereby granulated material can be easily produced.

The average pressure, velocity and flow rate of pulsating vibration air becomes small compared to the prior art using a fixed and uniform air because the raw material A stored in the granulation tank 2 is easily fluidized by using pulsating vibration air compared to such a prior art. Therefore, the shock energy when the raw material A, the granulating material and the granulated material collide in the process of granulation can be made small. According to this granulation method, the amount of the fine particles produced by collision of the particles is reduced because the impact caused by collision of each particles in the granulation process is small. Thereby, the amount of fine particles contained in the granulated material can be reduced.

In case that the air source 3 is a blower fan, the frequency, amplitude and wave shape of the pulsating vibration air can be easily changed by controlling the revolution number of the fan or by controlling the revolution speed of the rotary valve 42 of the pulsating vibration air generation means 4.

Accordingly, when the frequency, amplitude and wave shape of the pulsating vibration air are changed depending on the property of the raw material A, a phenomenon such as slacking, bubbling, chanelling and so on in the process of granulation which stop fluidization of the raw material A is prevented or relieved compared to the prior art wherein heated air is supplied into the granulation tank 102 with a fixed and uniform rate, whereby granulated material can be easily produced.

In case that a vehicle and an active component are compound at a fixed rate as the material A, granulated material with uniform compounding rate can be produced because the raw material A stored in the granulation tank 2 is uniformly stirred to be fluidized by applying pulsating vibration air.

The present invention is explained based on the specific data of the experiment.

Figure 5:
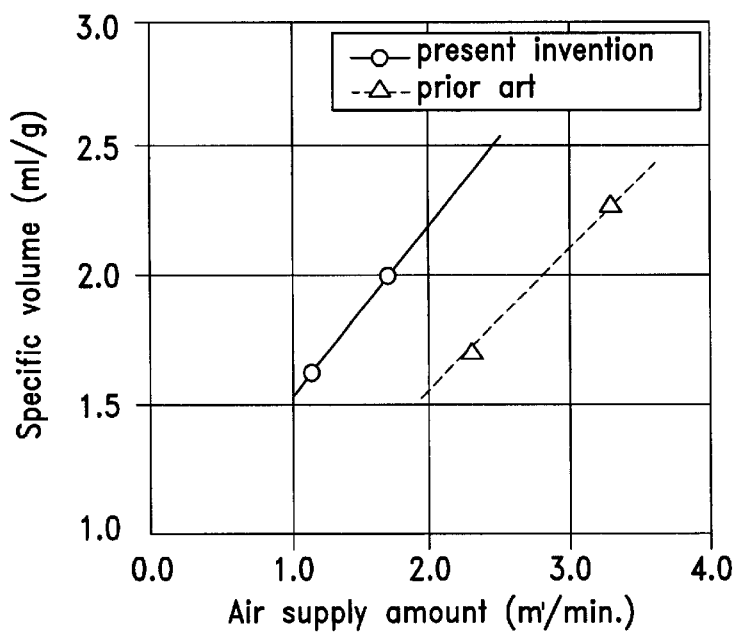
FIG. 5 is a graph showing the result of the experiment wherein the amount of air required for granulating the material of the same specific volume is compared in the present invention and the prior art.

FIG. 5 is the result of the experiment wherein the amount of air required for producing the granulated material of the same specific volume from the original material with the same ingredient and amount was compared in the present invention and the prior art. In this case the granulation tank 2 of the same size and shape was used, the air source 3 was driven under the same condition, and the heating means 5 was heated under the same condition.

The system shown in FIG. 1 is used for the experiment. In the prior art, the rotary valve 42 of the pulsating vibration means 4 was stopped where the air source 3 and the granulation tank 2 were communicated (the rotary valve 42 is at the position shown in a solid line in FIG. 2) and material was granulated according to the prior method. The specific volume (ml/g) of the granulated material and the supplied flow amount ($m^3$/min.) supplied into the granulation tank 2 were measured.

Methylcellulose dissolved in water was used as a binding solution and lactose was used as powdered raw material. (They were also used for the following experiments.)

In the present invention, the rotary valve 42 was rotated at 5 Hz and other conditions were the same as in the prior art. In such a condition the specific volume (ml/g) of the granulated material and the supplied flow amount ($m^3$/min.) at the air supplied into the granulation tank 2 were measured.

As shown in FIG. 5, it is clear that the amount of air required for granulating the material of the same specific volume in the present invention is less than that in the prior art.

Figure 6:
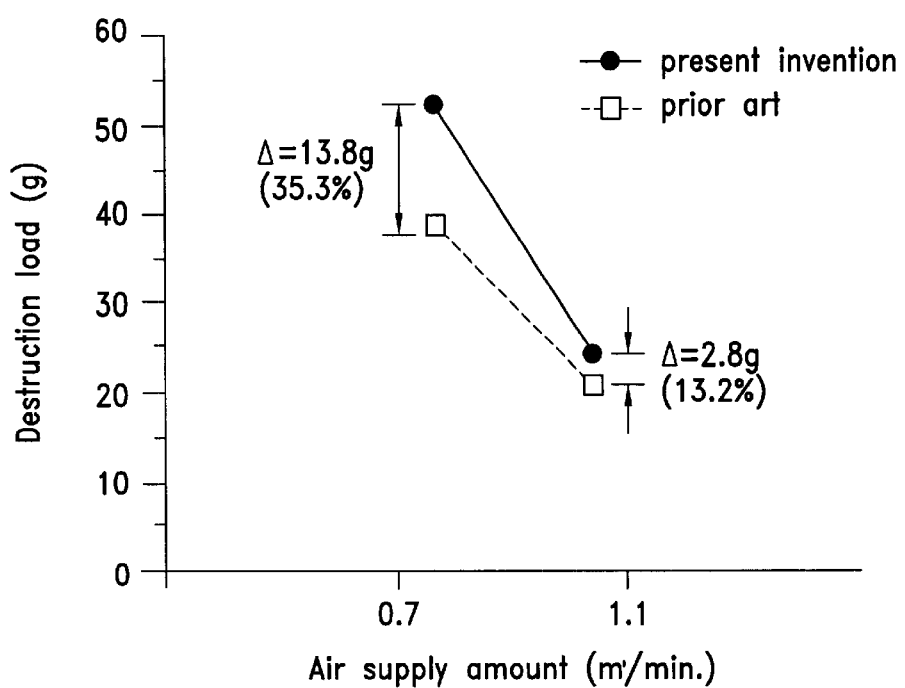
FIG. 6 is a graph showing the correlation of the amount of air used for granulation and the breaking load of the granulated material.

FIG. 6 is a graph showing the correlation of the amount of air used for granulation and the breaking load of the granulated material.

The system shown in FIG. 1 was used for the experiment. In the prior art, the rotary valve 42 of the pulsating vibration air generation means 4 was stopped where the air source 3 and the granulation tank 2 was communicated (the rotary valve 42 is at the position shown in a solid line in FIG. 2) and material was granulated according to the prior method. The supplied flow amount ($m^3$/min.) of the air supplied into the granulation tank 2 was varied and the breaking load of the granulated material produced at each supplied flow amount ($m^3$/min.) was measured.

In the present method the material was granulated when the rotary valve 42 was rotated at 5 Hz and other conditions were the same as in the prior art. Under such a condition the breaking load of the granulated material was measured.

According to the result in FIG. 6, hard granulated material, that is mechanically strong, is obtained in the present invention compared to the granulated material obtained in the prior art when the amount of air used for granulation is the same.

Figure 7:
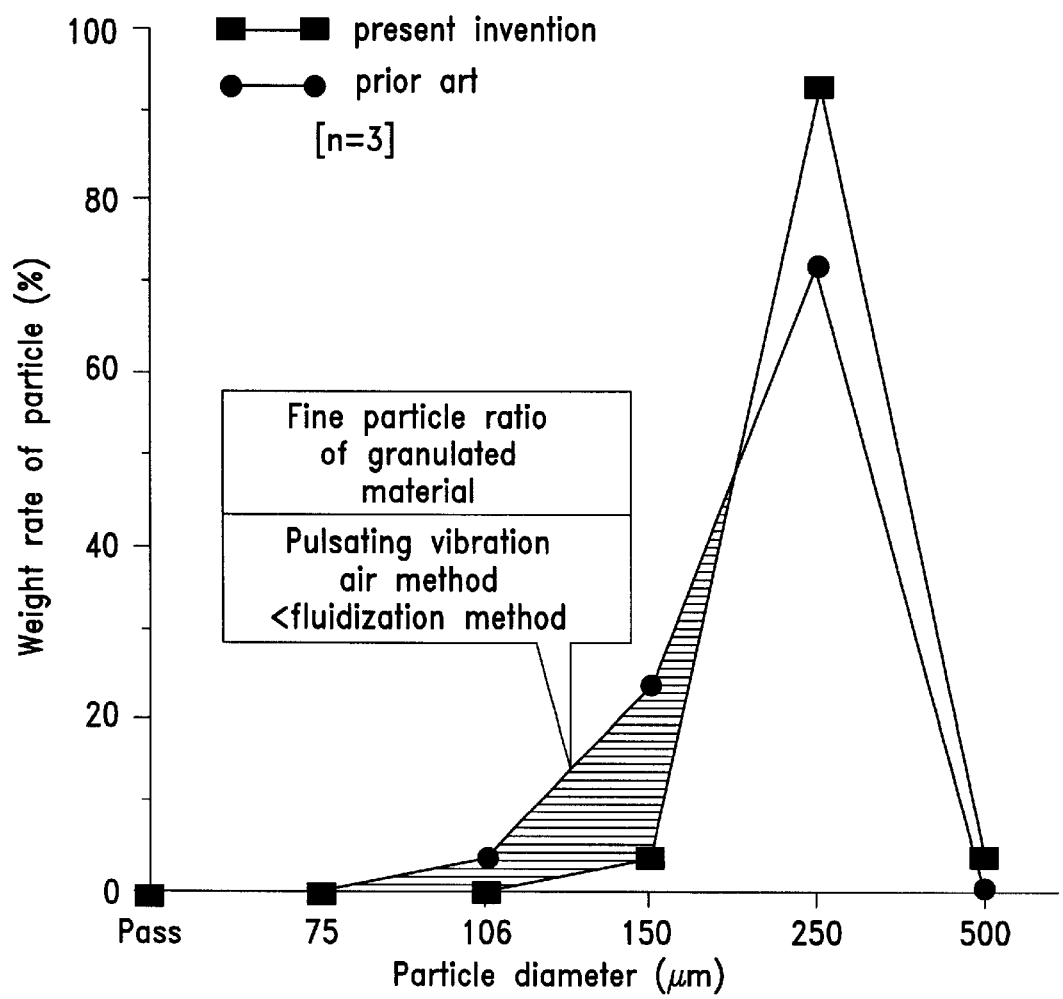
FIG. 7 shows a graph compared particle size distribution of the granulated material produced by the prior art and the granulated material produced by the present invention.

FIG. 7 shows a graph compared particle size distribution of the granulated material produced in the prior art and that in the present invention.

The system shown in FIG. 1 was used for the experiment. In the prior art, the rotary valve 42 of the pulsating vibration air generation means 4 was stopped where the air source 3 and the granulation tank 2 were communicated (the rotary valve 42 is at the position shown in a solid line in FIG. 2) and material was granulated by supplying uniform and fixed amount of heated air into the tank 2 according to the prior method. In this experiment the particle size distribution of the granulated material was measured after the granulation.

In the present method the material was granulated when the rotary valve 42 was rotated at 5 Hz and other conditions were the same as in the prior art. Under such a condition the particle size distribution of the granulated material was measured.

According to FIG. 7, it is clear that the particle size distribution of the granulated material in the present invention was sharp compared to the prior art.

Further according to FIG. 7, it is also clear that fine particles contained in the granulated material can be reduced in the present invention compared to the prior art.

Figure 8:
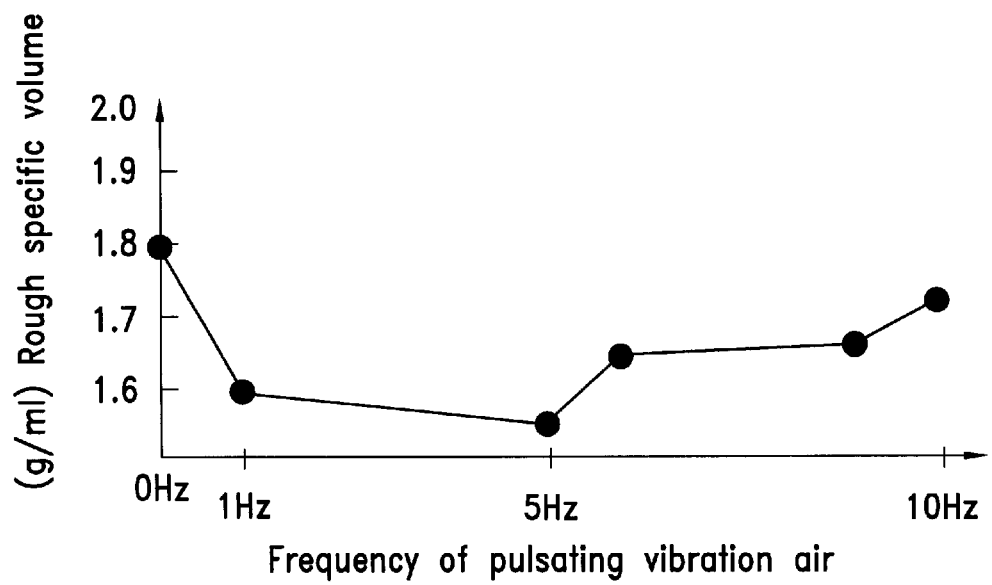
FIG. 8 is a graph showing the correlation of the frequency of the pulsating vibration air used for granulation and the rough specific volume of the granulated material.

Table 1 shows the result of the experiment wherein the rough specific volume of the granulated material is measured by varying the frequency of the pulsating vibration air. FIG. 8 is a graph showing the correlation of the frequency of the pulsating vibration air used for granulation and the rough specific volume of the granulated material.

TABLE 1

| frequency of pulsating vibration air (Hz) | 0 | 1 | 5 | 6 | 9 | 10 |
| --- | --- | --- | --- | --- | --- | --- |
| rough specific volume (ml/g) | 1.896 | 1.698 | 1.643 | 1.741 | 1.768 | 1.837 |

According to the result, when pulsating vibration air with the frequency of 0 Hz (steady flow air) and 10 Hz is applied, the rough specific volume of the granulated material in the present invention applying 10 Hz pulsating vibration air is about the same as that of the prior art applying steady flow air. As shown in Table 1 and FIG. 8, the frequency of the pulsating vibration air is preferably not less than 1 Hz and less than 10 Hz. It is preferable to be from 1 Hz to 9 Hz for reducing the specific volume at 20%. To reduce 50%, the frequency is desirable from 1 Hz to 6 Hz. Pulsating vibration air with 5 Hz frequency is preferred in order to obtain the minimum rough specific volume.

Figure 9:
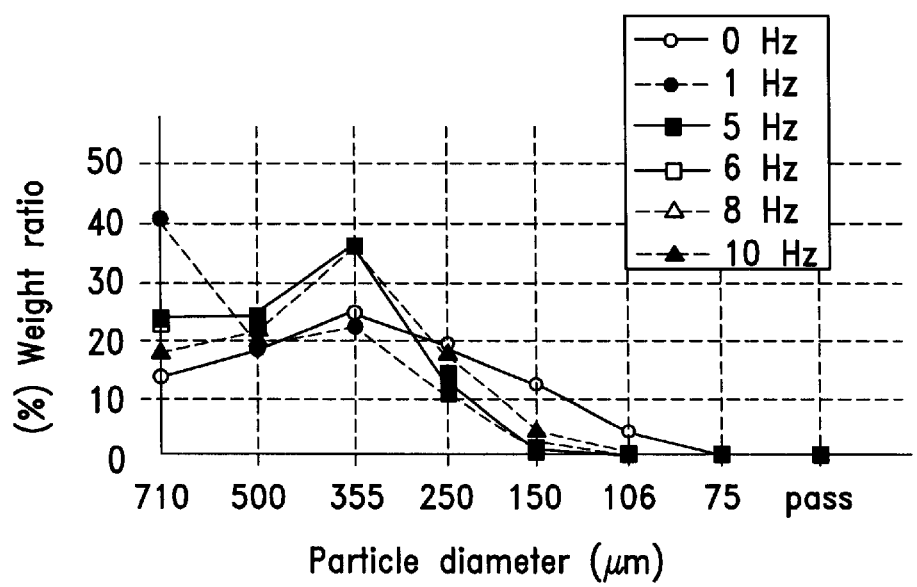
FIG. 9 is a graph showing the correlation of the frequency of the pulsating vibration air used for granulation and the particle size distribution of the granulated material.

Table 2 shows the particle size distribution of the granulated material produced by varying the frequency of the pulsating vibration air. FIG. 9 is a graph showing the correlation of the frequency of the pulsating vibration air used for granulation and the particle size distribution of the granulated material. Pulsating vibration air with 0 Hz, 1 Hz, 5 Hz, 6 Hz, 9 Hz or 10 Hz was applied and the granulated material was passed through a screen with 710 μm diameter mesh, 500 μm, 355 μm, 250 μm, 150 μm, 106 μm, or 75 μm. Then the weight of the particles remained on the mesh and the weight of the particles passed through were measured and they are shown as weight percent. The granulated material with sharp particle size distribution focused on narrow range is good quality having uniform particle diameter.

TABLE 2

| frequency of pulsating vibration air (Hz) | 0 | 1 | 5 | 6 | 9 | 10 |
| --- | --- | --- | --- | --- | --- | --- |
| ON 710 μm (Weight %) | 16.5 | 41.8 | 23.4 | 22.1 | 19.8 | 18.2 |
| ON 500 μm (weight %) | 19.7 | 19.4 | 25.0 | 24.6 | 23.3 | 22.2 |
| ON 355 μm (weight %) | 26.1 | 24.2 | 36.2 | 36.1 | 36.0 | 35.7 |
| ON 250 μm (weight %) | 20.2 | 11.6 | 13.3 | 14.7 | 17.2 | 19.2 |
| ON 150 μm (weight %) | 12.2 | 2.9 | 2.0 | 2.5 | 3.7 | 4.7 |
| ON 106 μm (weight %) | 5.3 | 0.0 | 0.0 | 0.0 | 0.0 | 0.0 |
| ON 75 μm (weight %) | 0.0 | 0.0 | 0.0 | 0.0 | 0.0 | 0.0 |
| PASS THROUGH (weight %) | 0.0 | 0.0 | 0.0 | 0.0 | 0.0 | 0.0 |

According to Table 2 and FIG. 9, the particle size distribution of the granulated material produced at 5 Hz or 10 Hz pulsating vibration air is focused on narrow range. However, about 5 Hz pulsating vibration air is preferable because the rough specific volume is small and the particle size distribution is focused on narrow range as shown in Tables 1, 2 and FIGS. 8, 9 when the rough specific volume is further considered.

When a dissolution test is executed for the granulated material produced at 1 Hz, 5 Hz, 6 Hz, 9 Hz and 10 HZ according to a rotating basket method described in Japanese Pharmacopoeia (the eleventh edition), similar dissolution pattern is seen.

When the granulated material produced according to the present method is used, tablets or capsules can be made small without influencing the solubility of the tablets or the capsules. Therefore, the compliance of a patient for dosing the tablets or the capsules can be highly improved and its dosing efficiency can be advanced.

Figure 3B:
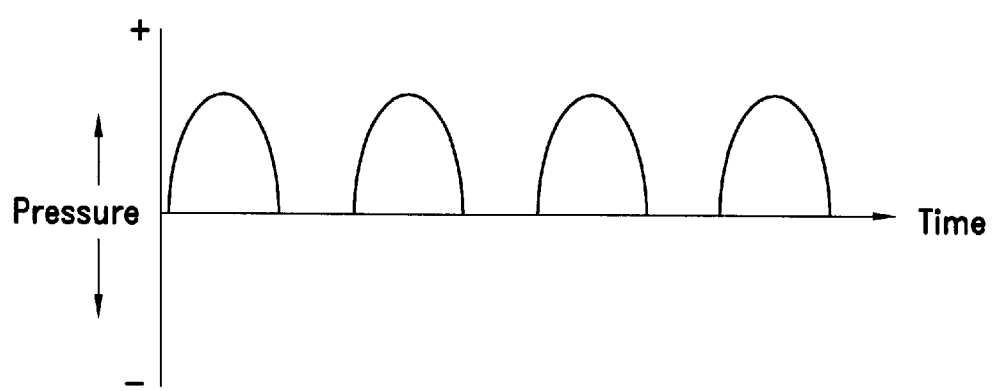

The rotary type pulsating vibration air generation means is used as the pulsating vibration air generation means 4 and is provided between the conduit pipe connecting the air source 3 and the granulation tank 2 in the above-mentioned embodiments. However, it is one of the preferred embodiments. An on-off valve such as a solenoid valve may be provided between the conduit pipe connecting the air source 3 and the granulation tank 2. In this case pulsating vibration air of which maximum is positive and minimum is atmospheric pressure as shown in FIG. 3(*b*) may be produced in the granulation tank 2 by communicating and shutting the air supplied from the air source 3 by opening and closing the conduit by means of the on-off valve.

The pulsating vibration air supplied into the granulation tank 2 is naturally discharged from the discharged port 2*b* of the tank 2 in the embodiments mentioned above. However, it is also one of the preferred embodiments. A suction means may be provided for the discharge port 2*b* and another pulsating vibration air generation means may be further provided between the conduit connecting the discharge port and the suction means.

In this case the suction means of the discharge port 2*b* is supplementarily provided to promote smooth discharge of the supplied pulsating vibration air out of the granulation tank 2. It is preferable pulsating vibration air, which fluidizes the raw material and some of which suspend up and down according to its frequency, is designed to be supplied in heated condition below the fluidization bed 7 to upward and the granulation tank 2 keeps the pressure more than atmospheric pressure.

When another pulsating vibration air generation means is further provided between the conduit connecting the discharge port 2*b* and the suction means, it is preferable that such a pulsating vibration air generation means is supplementary for changing the wave shape a little or promoting rise of the raw material A in the granulation tank 2 relative to the pulsating vibration air generation means 4.

Some raw material A are easy to be mixed with air and the others are not. Therefore, it may be preferable to change the wave shape of the pulsating vibration air in order to fluidize the material stored in the granulation tank and make the aggregated material suspend up and down according to the frequency of the pulsating vibration air.

Figure 10A:
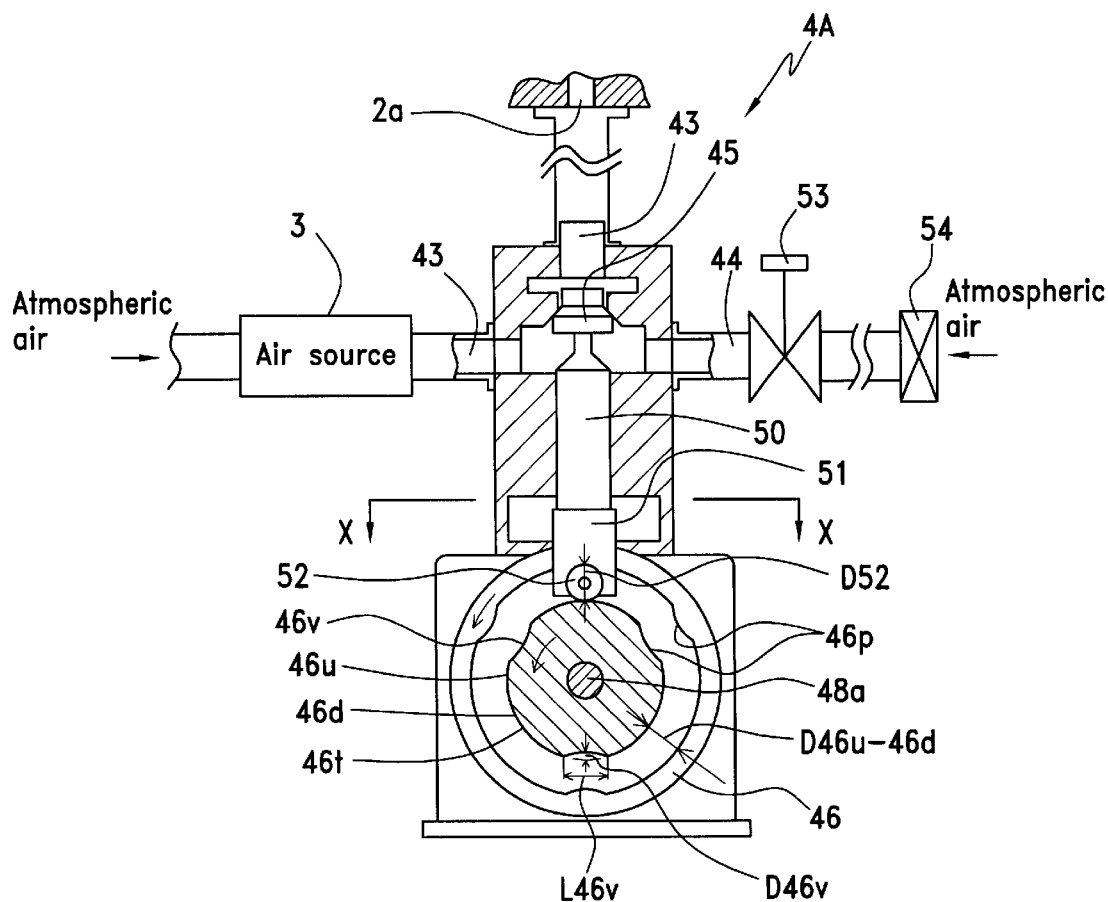
FIG. 10(a) shows a sectional side view and FIG. 10(b) shows a sectional view along with X—X line in FIG. 10(a).
Figure 10B:
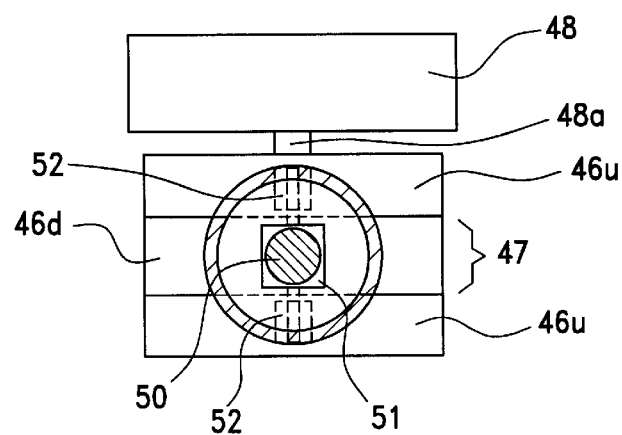

FIG. 10 shows the granulation system provided with the pulsating vibration air generation means which can easily change its wave shape into a desirable one.

A piston type pulsating vibration air generation means 4A is provided instead of the pulsating vibration air generation means 4 of FIG. 2. The pulsating vibration air generation means 4A is provided with a valve 45 for opening and closing a conduit 43 connecting the air source 3 and the heated air supply port 2a and a valve cam mechanism 46 having a specific circular pattern 46p regulating the open-close duration and the amount of the valve 45.

A rotary drum is used as the valve cam mechanism 46 and is provided rotatably around an axis 48a by means of a driving means 48 such as a motor. Upper rails 46u and a lower rail 46d with desirable specific circular patterns 46p are provided in a circumferential direction of the drum 46. An opening 47 is provided between the upper rails 46u so as to surround the drum 46 in a circumferential direction as shown in FIG. 10 (b).

A power transmission axis 50 is connected with the valve 45 and is provided with an attachment 51 for rotatably fitting rollers 52 at its bottom end. The diameter D52 of the rollers 52 is designed to be the length D46u–46d between the upper rail 46u and the lower rail 46d.

The width of the opening 47 is set to be a little larger than the width of the attachment 51. The attachment 51 and the power transmission axis 50 are fitted in the opening 47 vertically.

Each roller 52 is provided between the lower rail 46d and the upper rail 46u and outside of the opening 47 respectively.

An air introduction pipe 44 is connected with the conduit 43, a solenoid valve 53 for opening and closing the pipe 44, and a filter 54 attached to the end of the pipe 44.

According to the pulsating vibration air generation means 4A, the valve 45 is closed when the specific circular pattern 46p is at its peak 46t and the valve 45 is opened when the pattern 46p is at its valley 46v. The opening degree of the valve 45 depends on the depth D46v of the valley 46v of the specific circular pattern 46p. The opening time of the valve 45 depends on the length L46v of the valley 46v and the rotation speed of the rotary drum 46.

How the pulsating vibration air with a desirable wave shape is generated is described according to the pulsating vibration air generation means 4A.

When the air source 3 is driven to rotate the rotary drum 46 at a fixed rotation speed, the valve 45 is opened and closed in compliance with the specific circular pattern 46p.

The rotary drum 46 with different specific circular pattern 46p may be used, the driving source of the air source 3 may be changed, the rotation speed of the drum 46 may be changed, or the solenoid valve 51 may be opened and closed in order to generate pulsating vibration air with a desirable wave shape, frequency and amplitude in the granulation tank 2.

According to such a pulsating vibration air generation means 4A, fluidization process can be executed easily by utilizing pulsating vibration air with desirable wave shape, frequency and amplitude wherein the raw material A stored in the granulation tank 2 can be fluidized and some of the fluidized material A can suspend up and down in compliance with the frequency of the pulsating vibration air.

If a vibrating means 21 is provided for a bag filter 13 and the bag filter 13 is vibrated by driving the vibrating means 21, clogging of the bag filter 13 during granulation can be prevented. Therefore, cleaning of the bag filter 13 during granulation isn't required so that granulation becomes easy.

The vibrating means 21 is provided with a vibration air source 22 such as a blower fan, a hollow conduit pipe 23, a control valve 24 such as a solenoid valve provided at the downstream of the air source 22, an elastic membrane 25, and a wire 26. One end of the pipe 23 is connected with the air source 22 and the other end is provided with the membrane 25 so as to close the hollow inside of the pipe 23. One end of the wire 26 is connected to the membrane 25 and the other end is connected to the bag filter 13. The source 22 is driven to supply air into the pipe 23, and intermittent air flow is generated by opening and closing the control valve 24 at a fixed cycle. The membrane 25 is expanded and returned to its original form by the intermittent air flow, whereby the intermittent air is transformed into a vibration energy at the downstream of the membrane 25. Such generated vibration energy is transmitted to the bag filter 13 via the wire 26 to be vibrated.

In the above-mentioned embodiment a blower fan is used as the air source 3, however, a gas cylinder containing compressed air or compressed inert gas may be used as the air source 3.

Figure 11B:
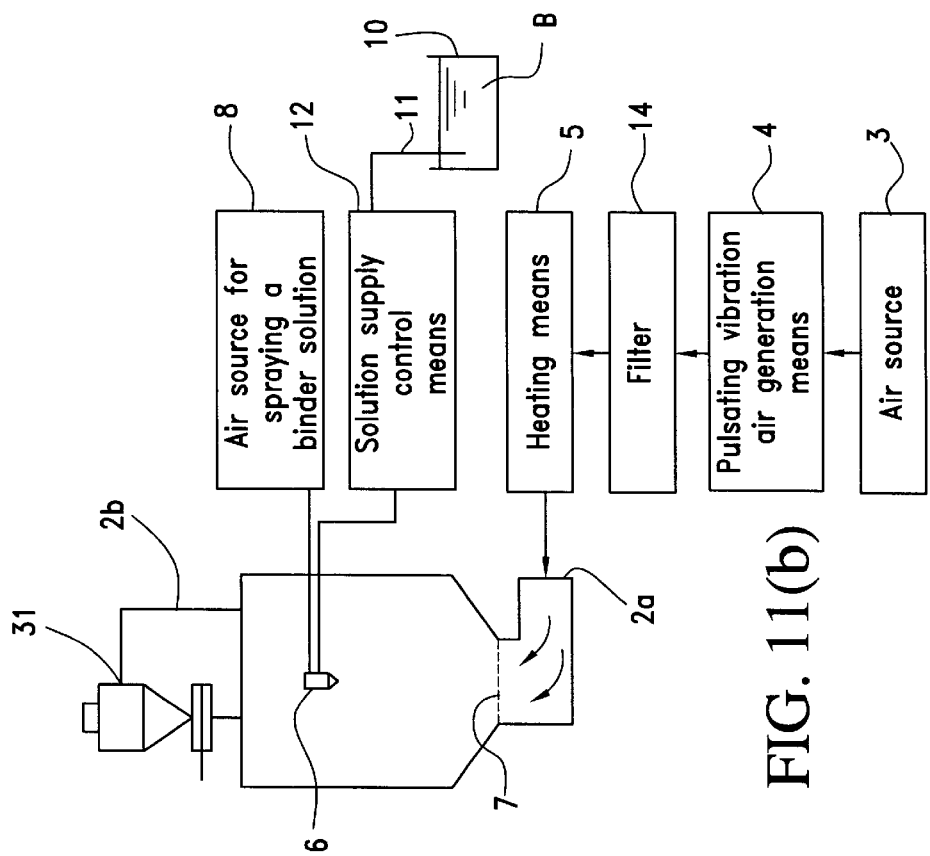
FIG. 11 shows a diagrammatic view of a modification of a granulation system according to the present invention.
In FIG. 11(a) a vibrator is provided for a bag filter and in FIG. 11(b) a cyclone is provided instead of a bag filter.
Figure 11A:
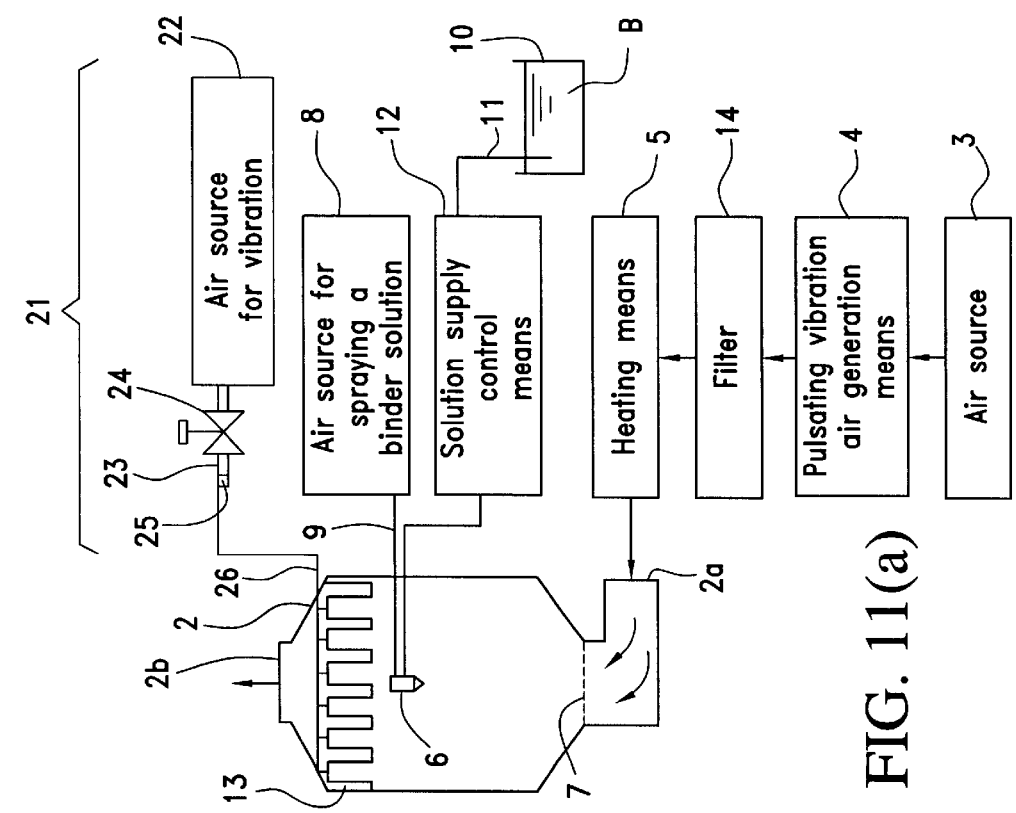
Figure 12:
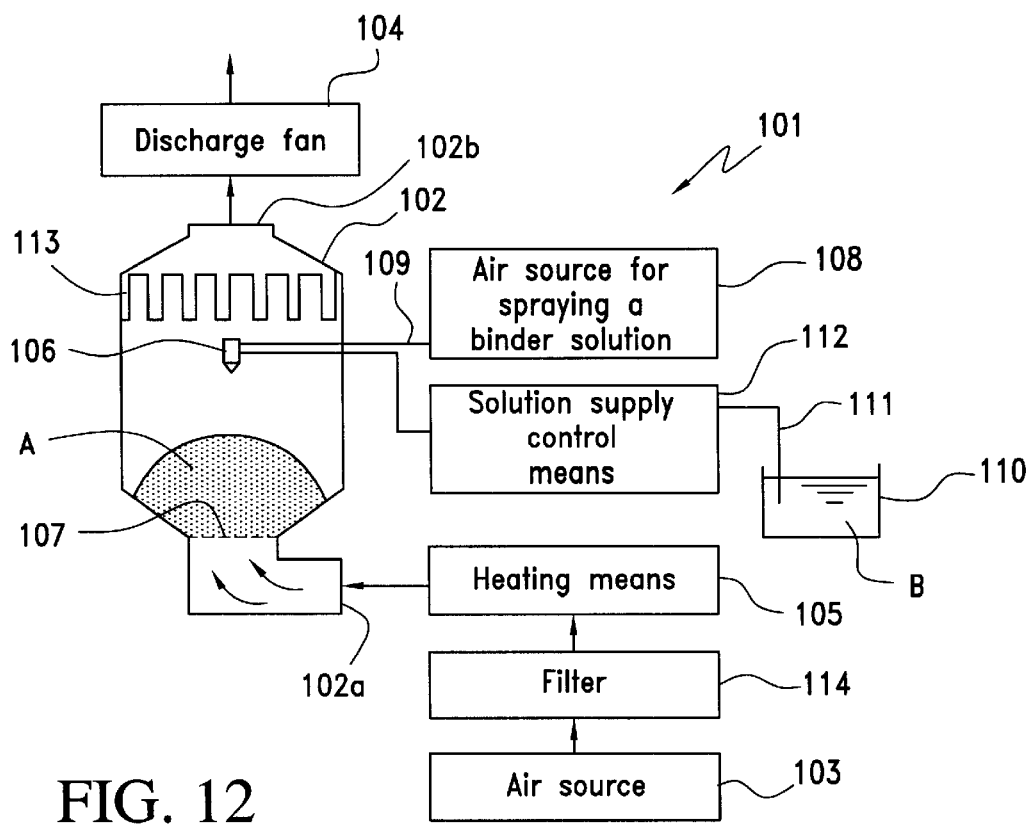
FIG. 12 is a diagrammatic view of the granulation system in the prior art.
Figure 13:
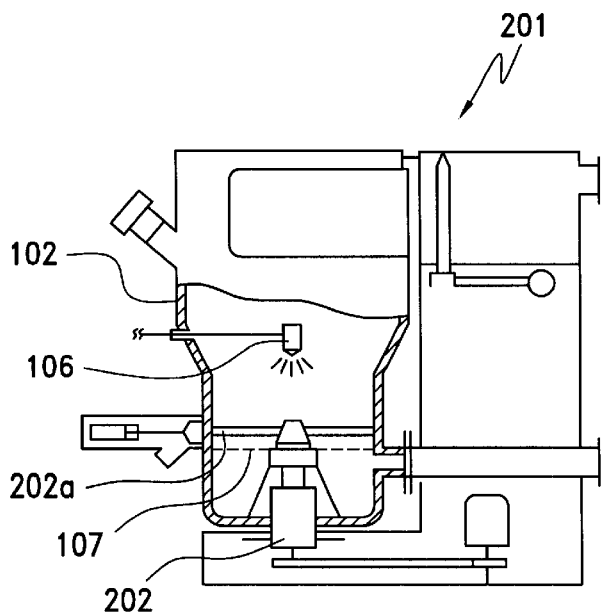
FIG. 13 is a sectional view, partially cutaway, of the granulation system proposed in JP-A-60-183030.

As shown in FIG. 11(b), a cyclone 31 may be used instead of the bag filter 13 to prevent the raw material A, the granulating material and the granulated material from flowing out of the granulation tank 2.

As mentioned above, according to the granulation method of the present invention, powdered material is fluidized by applying heated pulsating vibration air, and aggregated when the binder solution is sprayed, then the aggregated powdered material drops and deposits on the fluidized bed while suspending up and down according to the frequency of the pulsating vibration air. And finally the granulating material deposited on the fluidized bed is compressed to be high density further by means of heated pulsating vibration air. Therefore, the projections like an antenna of a snail is prevented from appearing on the surface of the particles of the granulating material and the granulated material doesn't become porous. Accordingly, heavy granulated material, which has uniform property such as particle diameter and shape and small specific volume, can be produced in a short time compared to the prior art wherein a low density fluidization layer is formed by increasing the amount of the air supplied in the granulation tank.

Whereas according to the granulation system of the present invention, the pulsating vibration air generation means is provided prior to the air supply port provided at the bottom of the granulation tank and the heated pulsating vibration air is supplied below the fluidization bed to upwards. The raw powdered material can be fluidized to be aggregated together and thus aggregated material can suspend up and down according to the frequency of the pulsating vibration air and drop and deposit on the fluidization bed. And then, the deposited material is compressed to be airtight by further supplying heated pulsating vibration air. Therefore, heavy granulated material, which has uniform property, such as particle diameter and shape, and high density and small specific volume, can be produced in a short time.

What is claimed is:

1. A production method for granulating powdered material, comprising the steps of:
   supplying powdered material to be granulated on a fluidization bed of a tank of a granulator;
   supplying heated pulsating vibration air under the fluidization bed;
   fluidizing the powdered material by applying heated pulsating vibration air at a given frequency selected from the range of 1 Hz to 10 Hz;
   aggregating the fluidized powdered material in the granulation tank by spraying a binder solution thereon;
   fluidizing the aggregated powder material by applying heated pulsating vibration air at a given frequency;
   dropping and depositing a part of intermediate powdered material under granulating of fluidized and aggregated powdered material on the fluidization bed continually while producing an up and down suspension of the material in compliance with said given frequency of the heated pulsating vibration air by means of vibration of the heated pulsating vibration air under the process of granulation; and
   applying a compression action by a vibration of the heated pulsating vibration air to a part of intermediate powdered material under granulating thus deposited on the fluidization bed and thereby making the fluidized and aggregated powdered material into granulated material having an increased density and a lower specific volume relative to the density and specific volume of the powdered material prior to being aggregated and fluidized.

2. The production method for granulating powdered material as set forth in claim 1, wherein said pulsating vibration air is a positive pulsating vibration air comprising waves with positive peaks and positive valleys.

3. The production method for granulating powdered material as set forth in claim 1, wherein at least either one of: amplitude, frequency and waveform of said pulsating vibration air is changed depending on the property of powdered material.

4. Production method for granulating powdered material as set forth in claim 1, wherein frequency of said pulsating vibration air is not less than 1 Hz and less than 10 Hz.

5. A production system for granulating powdered material, comprising:
   a granulation tank for storing powdered material to be granulated, said granulation tank having a supply port at the bottom thereof for introducing heated air, a discharge port at the top thereof for discharging the introduced heated air, and a fluidization bed provided above said supply port for placing the powdered material;
   spray means for spraying a binder solution provided in said granulation tank for aggregating the powdered material supported in said granulation tank to grow the powdered material;
   an air source connected to said supply port of said granulation tank via a conduit pipe;
   heating means interposed in said conduit pipe for heating the air generated from said air source;
   pulsating vibration air generation means interposed in said conduit pipe for converting the air generated from said air source to pulsating vibration air wherein said pulsating vibration air generation means operates at a given frequency;
   air control means for controlling an air pressure of air generated from said air source; and
   means for controlling said pulsating vibration air generation means;
   wherein, a part of intermediate powdered material under granulating on said fluidization bed is continually dropped and deposited while being suspended and down in compliance with the frequency of the pulsating vibration air wherein said given frequency is selected from the range of 1 Hz to 10 Hz by means of vibration of said heated pulsating vibration air under the process of granulation with said air control means and/or means of controlling said pulsating vibration air generation means.

6. The production system for granulating powdered material as set forth in claim 5, wherein said pulsating vibration air generation means comprises:
   a cylindrical casing having a pair of connecting ports at the surrounding wall thereof;
   a rotary valve having a rotational axis in the center of said cylindrical casing, said valve constructed so as to divide the inside of said cylindrical casing into at least two spaces; and
   one of said pair of connecting ports being connected with said heat air supply port and the other port being connected with said air source.

7. The production system for granulating material as set forth in claim 5, wherein said pulsating vibration air generation means comprises:
   a valve for opening and closing said conduit pipe connecting said air source and said heat air supply port; and
   a valve cam mechanism having guide rails with a specific circular pattern defining the duration and amount of opening and closing of said valve,
   whereby said valve is opened or closed in compliance with said specific circular pattern by driving said valve cam mechanism.

8. A production method for granulating powdered material, comprising the steps of:
   supplying powdered material to be granulated on a fluidization bed of a tank of a granulator;
   supplying an air with a constant air pressure generated by driving an air source under said fluidization bed so as to fluidize said powdered material;
   converting said air with a constant air pressure generated with said air source into pulsating vibration air by driving a pulsating vibration air generation means, keeping a driving condition of said air source the same as a condition when all of said powdered material is substantially fluidized with said constant air pressure;
   heating said pulsating vibration air with a heater into heated pulsating vibration air;
   supplying the heated pulsating vibration air under said fluidization bed;
   fluidizing the powdered material by applying the heated pulsating vibration air at a given frequency selected from a range of 1 Hz to 10 Hz;
   aggregating the fluidized powdered material in the granulation tank by spraying a binder solution thereon,
   fluidizing the aggregated powdered material by applying the heated pulsating vibration air at a given frequency,
   dropping and depositing a part of intermediate powdered material under granulating of fluidized and aggregated powdered material on the fluidization bed continually while producing an up and down suspension of the material in compliance with said given frequency of the heated pulsating vibration air by means of vibration of said heated pulsating vibration air under the process of granulation, and applying a compression action by a vibration of the heated pulsating vibration air to a part of intermediate powdered material under granulating thus deposited on the fluidized bed and thereby making the fluidized and aggregated powdered material into granulated material having an increased density and a lower specific volume relative to the density and specific volume of the powdered material prior to being aggregated and fluidized.

9. The production method for granulating powdered material as set forth in claim 8, wherein said pulsating vibration air is a positive pulsating vibration air comprising waves with positive peaks and positive valleys.

10. A production method for granulating powdered material comprising the steps of:

supplying powdered material to be granulated on a fluidization bed of a tank of a granulator;

supplying heated pulsating vibration air comprising wave as with positive peaks and negative valleys;

fluidizing the powdered material by applying the heated pulsating vibration air comprising waves with positive peaks and negative valleys at a given frequency selected from a range of 1 Hz to 10 Hz;

aggregating the fluidized powdered material in the granulation tank by spraying a binder solution thereon;

dropping and depositing a part of intermediate powdered material under granulating of fluidized and aggregated powdered material on the fluidization bed continually while producing an up and down suspension of the material in compliance with said given frequency of the heated pulsating vibration air by means of vibration of said heated pulsating vibration air under the process of granulation; and applying a compression action by a vibration of the heated pulsating vibration air to a part of intermediate powdered material under granulating thus deposited on the fluidized bed and thereby making the fluidized and aggregated powdered material into granulated material having an increased density and a lower specific volume relative to the density and specific volume of the powdered material prior to being aggregated and fluidized.

11. A production system for granulating powdered material, comprising:

a granulation tank for storing powdered material to be granulated, said granulating tank having a supply port at the bottom thereof for introducing heated air, a discharge port at the top thereof for discharging the introduced heated air, and a fluidization bed provided above said supply port for placing the powdered material;

spraying means for spraying a binder solution provided in said granulation tank for aggregating the powdered material supported in said granulation tank to grow the powdered material;

an air source connected to said supply port of said granulation tank via a conduit pipe;

heating means interposed in said conduit pipe for heating the air generated from said air source;

pulsating vibration air generation means interposed in said conduit pipe for converting the air generated from said air source to pulsating vibration air;

air control means for controlling an air pressure of an air generated by said air source; and means for controlling said pulsating vibration air generation means, wherein, a part of intermediate powdered material under granulating on said fluidization bed is continually dropped and deposited while being suspended up and down in compliance with the frequency of the pulsating vibration air under the process of granulation under such a condition as keeping a driving condition of said blower with said air control means the same as a condition when all of said powdered material is substantially fluidized and fluidizing the powdered material by applying the heated pulsating vibration air at a given frequency selected from a range of 1 Hz to 10 Hz with said means of controlling said pulsating vibration air generation means.

12. The production system for granulating powdered material as set forth in claim 11, wherein said pulsating vibration air generation means comprises:

a cylindrical casing having a pair of connecting ports at the surrounding wall thereof;

a rotary valve having a rotational axis in the center of said cylindrical casing, said valve constructed so as to divide the inside of said cylindrical casing into at least two spaces, and one of said pair of connecting ports being connected with said heated air supply port and the other port being connected with said air source.

13. The production system for granulating material as set forth in claim 11, wherein said pulsating vibration air generation means comprises;

a valve for opening and closing said conduit pipe connecting said air source and said heated air supply port; and a valve cam mechanism having guide rails with a specific circular pattern defining the duration and amount of opening and closing of said valve, whereby said valve is opened or closed in compliance with said specific circular pattern by driving said valve cam mechanism.

14. A production system for granulating material, comprising:

a granulation tank for storing powdered material to be granulated, said granulation tank having a supply port at the bottom thereof for introducing heated air, a discharge port at the top thereof for discharging the introduced heated air, and a fluidization bed provided above said supply port for placing the powdered material;

spray means for spraying a binder solution provided in said granulation tank for aggregating the powdered material supported in said granulation tank to grow the powdered material;

an air source connected to said supply port of said granulation tank via a conduit pipe;

pulsating vibration air generation means for converting an air with a constant air pressure into pulsating vibration air comprising waves with positive peaks and negative valleys under fluidization bed which is installed between said air source and said supply port of said granulation tank;

heating means interposed in said conduit pipe for heating the pulsating vibration air comprising waves with positive peaks and negative valleys and supplying a heated pulsating vibration air comprising waves with positive peaks and negative valleys to said supply port of said granulation tank;

air control means for controlling an air pressure of an air generated from said air source; and means for controlling said pulsating vibration air generation means, wherein, a part of intermediate powdered material under granulation on said fluidization bed is continually dropped and deposited while being suspended up and down in compliance with the frequency of the pulsating vibration air comprising waves with positive peaks and negative valleys supplied under said fluidization bed.

15. A production system for granulating material, comprising:

a granulation tank for storing powdered material to be granulated, said granulation tank having a heated air supply port at the bottom thereof for introducing heated air, a discharge port at the top thereof for discharging the introduced heated air, and a fluidization bed provided above said supply port for placing the powdered material;

spray means for spraying a binder solution provided in said granulation tank for aggregating the powdered material supported in said granulation tank to grow the powdered material;

an air source for generating an air with a constant air pressure with an air suction port and an air supply port;

pulsating vibration air generation means for converting an air with a constant air pressure generated with said air source into pulsating vibration air comprising waves with positive peaks and negative valleys, which comprises;

a cylindrical casing having a first connecting port, a second connecting port, a third connecting port and a fourth connecting port spaced at equal intervals at a surrounding wall of said cylindrical casing respectively;

said fourth connecting port is communicated with the atmosphere;

a rotary valve having a rotational axis in the center of said cylindrical casing and driving the inside of said cylindrical casing into two spaces;

a first conduit connected with said heated air supply port of said granulation tank and said second connecting port of said pulsating vibration air generation means;

a second conduit connected with said air suction port of said air source;

a third conduit, the one end of which is connected with said air supply port of said air source and the other end of which is connected with a connector;

a fourth conduit, the one end of which is connected with said connector and the other end of which is connected said third connecting port of said pulsating vibration air generation means;

a fifth conduit, the one end of which is connected with said connector and the other end of which is connected with a certain position on the way of said first conduit;

heating means provided outside of said first conduit, for heating said pulsating vibration air comprising waves with positive peaks and negative valleys and supplying a heated pulsating vibration air comprising waves with positive peaks and negative valleys into said supply port of said granulation tank; and means for controlling said pulsating vibration air generation means, wherein, a part of intermediate powdered material under granulating on said fluidization bed is continually dropping and deposited while being suspended up and down in compliance with the frequency of the pulsating vibration by means of vibration of said heated pulsating vibration air comprising waves with positive peaks and negative valleys supplied under said fluidization bed.

* * * * *

UNITED STATES PATENT AND TRADEMARK OFFICE
CERTIFICATE OF CORRECTION

PATENT NO.     : 6,464,737 B1
DATED          : October 15, 2002
INVENTOR(S)    : Kiyoshi Morimoto et al.

It is certified that error appears in the above-identified patent and that said Letters Patent is hereby corrected as shown below:

<u>Column 16,</u>
Line 7, "suspended and" should be -- suspended up and --.

Signed and Sealed this

First Day of April, 2003

JAMES E. ROGAN
*Director of the United States Patent and Trademark Office*